United States Patent

Shimomura

[11] Patent Number: 5,829,930
[45] Date of Patent: Nov. 3, 1998

[54] ARRANGEMENT FOR PREVENTING CHIP FROM FLYING ABOUT IN CRANKSHAFT MILLER

[75] Inventor: Masumi Shimomura, Ishikawa-ken, Japan

[73] Assignee: Komatsu Machinery Corporation, Ishikawa-ken, Japan

[21] Appl. No.: 745,482

[22] Filed: Nov. 12, 1996

[30] Foreign Application Priority Data

Nov. 13, 1995 [JP] Japan .................................... 7-294036

[51] Int. Cl.⁶ ...................................................... B23C 9/00
[52] U.S. Cl. ........................ 409/134; 409/137; 409/197; 409/199
[58] Field of Search ..................... 409/134, 137, 409/197, 199, 200; 82/106

[56] References Cited

U.S. PATENT DOCUMENTS

| | | | |
|---|---|---|---|
| 3,880,025 | 4/1975 | Kralowetz et al. ...................... | 409/197 |
| 4,040,336 | 8/1977 | Lewis et al. ............................. | 409/134 |
| 4,090,422 | 5/1978 | Berbalk ..................................... | 82/106 |
| 5,451,122 | 9/1995 | Noda et al. ............................... | 409/137 |
| 5,647,705 | 7/1997 | Shimomura .............................. | 409/199 |

FOREIGN PATENT DOCUMENTS

| | | |
|---|---|---|
| 64-12741 | 1/1989 | Japan . |
| 64-4546 | 1/1989 | Japan . |
| 7-136891 | 5/1995 | Japan . |

*Primary Examiner*—A. L. Pitts
*Assistant Examiner*—Christopher Kirkman
*Attorney, Agent, or Firm*—Armstrong, Westerman, Hattori, McLeland & Naughton

[57] ABSTRACT

A crankshaft miller performs cutting work by means of a cutter mounted on a rotary cutter drum, for a work which both ends are gripped by chucks, and clamps a portion in the vicinity of a processed portion of the work by a rest arm to be opened and closed. An arrangement for preventing chip from flying around includes a chip flying around preventing cover which is designed for preventing chip from flying around upon stopping of the rotary cuter drum. The chip flying around preventing cover includes a main cover positioned in the vicinity of the rotary cutter drum and having an opening with a diameter sufficiently larger than an external diameter of the chuck when a rotary cutter drum is positioned at a stand-by position; and an auxiliary cover mounted on an opening portion of the main cover and having an opening with a diameter slightly larger than the external diameter of the chuck.

16 Claims, 6 Drawing Sheets

ARRANGEMENT FOR PREVENTING CHIP FROM FLYING ABOUT IN CRANKSHAFT MILLER

BACKGROUND OF THE INVENTION

1. Field of the Invention

The present invention relates generally to a crankshaft miller. More specifically, the invention relates to an arrangement for preventing chips from flying about in the crankshaft miller.

2. Description of the Related Art

Conventionally, a crankshaft miller for performing cutting work of a crankshaft of an engine, or so forth is constructed to perform cutting for a work secured at both ends by chucks, by means of a rotary cutter. During cutting, a large amount of chip fly around.

Therefore, there have been proposed, in the prior art, various arrangements for preventing chips generated during cutting work from flying around.

For instance, Japanese Unexamined Utility Model Publication (Kokai) No. Showa 64-12741 (Japanese Examined Utility Model Publication (Kokoku) No. Heisei 5-33238) proposes a rest arrangement of a crankshaft miller. In the proposed construction, a cover is mounted on a mounting seat of a rest main body which is not used during cutting work in place of a pad, and thus prevents chips from flying around by the cover.

On the other hand, Japanese Unexamined Utility Model Publication No. Showa 64-4546 (Japanese Examined Utility Model Publication No. Heisei 6-1314) proposes a chip flying around preventing arrangement for the crankshaft miller. In the proposed arrangement, a cover is provided for covering an opening portion defined between a cut-out and a work upon closure of a clamp cover for preventing chip from flying around during cutting work by means of the cover.

On the other hand, Japanese Unexamined Patent Publication No. Heisei 7-136891 proposes a chip flying about preventing arrangement for the crankshaft miller. In the proposed construction, upon removal of chip deposited on the chuck and/or claw body by way of blown air, a cutting unit is shifted at a position while a cutter drum covers the front side of the chuck so that flying around of chip can be prevented.

The measures proposed in the foregoing Japanese Unexamined Utility Model Publications Nos. Showa 64-12741 and Showa 64-4546, prevent flying around of chips generated during cutting work. On the other hand, the measure proposed in Japanese Unexamined Patent Publication No. Heisei 7-136891 prevents flying around of chips when the chuck and/or claw body is cleaned by way of blown air upon feeding in and out of the work.

However, flying around of chips can also be caused not only during cutting work and upon feeding in and out of work, but also during stopping operation of the cutter.

Discussion will be given with reference to FIG. 1. Namely, chips generated during cutting work of a work a by rotating a cutter f may deposit on the inner periphery of a cutter drum b by centrifugal force.

Subsequently, after completion of cutting work of the work a, the cutter drum b is stopped with returning the cutter drum b and a rest c at initial position as shown in FIG. 1. At this time, according to deceleration of rotation of the cutter drum b, deposition force of the chips deposited on the inner periphery of the cutter drum b by centrifugal force can be reduced to cause the chips to fall down toward the chuck side d by their own weight.

On the other hand, the conventional chip flying around preventing cover e is mounted on the rest c. In order to facilitate exchanging of the cutter f, an opening g sufficiently greater than the external diameter of the cutter f is formed.

Therefore, chips falling down from the internal periphery of the cutter drum b, upon stopping of the cutter drum, may fly around through the opening g. It is not possible to prevent chips from flying around upon stopping of the cutter f, by the conventional chip flying around preventing arrangement or preventing method.

SUMMARY OF THE INVENTION

The present invention has been worked out for solving the problem set forth above. It is an object of the present invention to provide a chip flying around preventing arrangement for a crankshaft miller which can certainly prevent flying around of chips generated upon stopping of a cutter.

According to the first aspect of the invention, an arrangement for preventing chips from flying around for a crankshaft miller which performs cutting work by means of a cutter mounted on a rotary cutter drum for a work whose both ends are gripped by chucks, and in which a of the work in the vicinity of a processed portion of said work is clamped by a rest arm that can be opened and closed. Such arrangement comprises:

a chip flying around preventing cover including;
  a main cover positioned in the vicinity of the rotary cutter drum and having an opening with a diameter sufficiently larger than an external diameter of the chuck when a rotary cutter drum is positioned at a stand-by position; and
  an auxiliary cover mounted on an opening portion of the main cover and having an opening with a diameter slightly larger than the external diameter of the chuck.

In the preferred construction, the auxiliary cover is detachably mounted on the main cover.

According to another aspect of the invention, a crankshaft miller comprises:

a rotary cutter drum carrying a plurality of tips;
work supports supporting both ends of a work to be processed;
chip deflecting positioned in a vicinity of the rotary cutter drum, each of the covers including;
first cover members for surrounding the adjacent work support and having with a covering plane perpendicular to an axis of said work support, the first cover members defining a first opening for allowing the work support to pass therethrough, and the peripheral edge of the first opening being concentrically spaced from the outer peripheral surface of the adjacent work support for defining an annular clearance therebetween; and
second cover member arranged within the annular clearance between the peripheral edge of the first opening and the outer periphery of the work support for surrounding corresponding the work support with a covering planes perpendicular to the axis of the work support, and the second cover member being detachably secured on the first cover member.

In practice, the crankshaft miller may further comprise clamping means rigidly secured on each of the first cover members for clamping the second cover member while the second cover member is set within the annular clearance.

The second cover member may be formed with a second opening for permitting the work support to pass therethrough, the peripheral edge of the second opening is opposite to the outer periphery of the work support with possible minimum clearance defined therebetween.

In the preferred construction, the crankshaft miller may further comprises work resting means including rest main body and rest arm pivotably mounted on the rest main body for gripping a portion in the vicinity of a portion being machined, of the work, and each of the first cover member is rigidly fixed on each of the rest main body.

In such case, the clamping means are provided at radially symmetrical positions on the first cover member. Each of the rest arms may be provided with means for accommodating the clamping means at the gripping position thereof.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of the present invention will be discussed hereinafter in detail with reference to the accompanying drawings, particularly to FIGS. 2 to 6. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
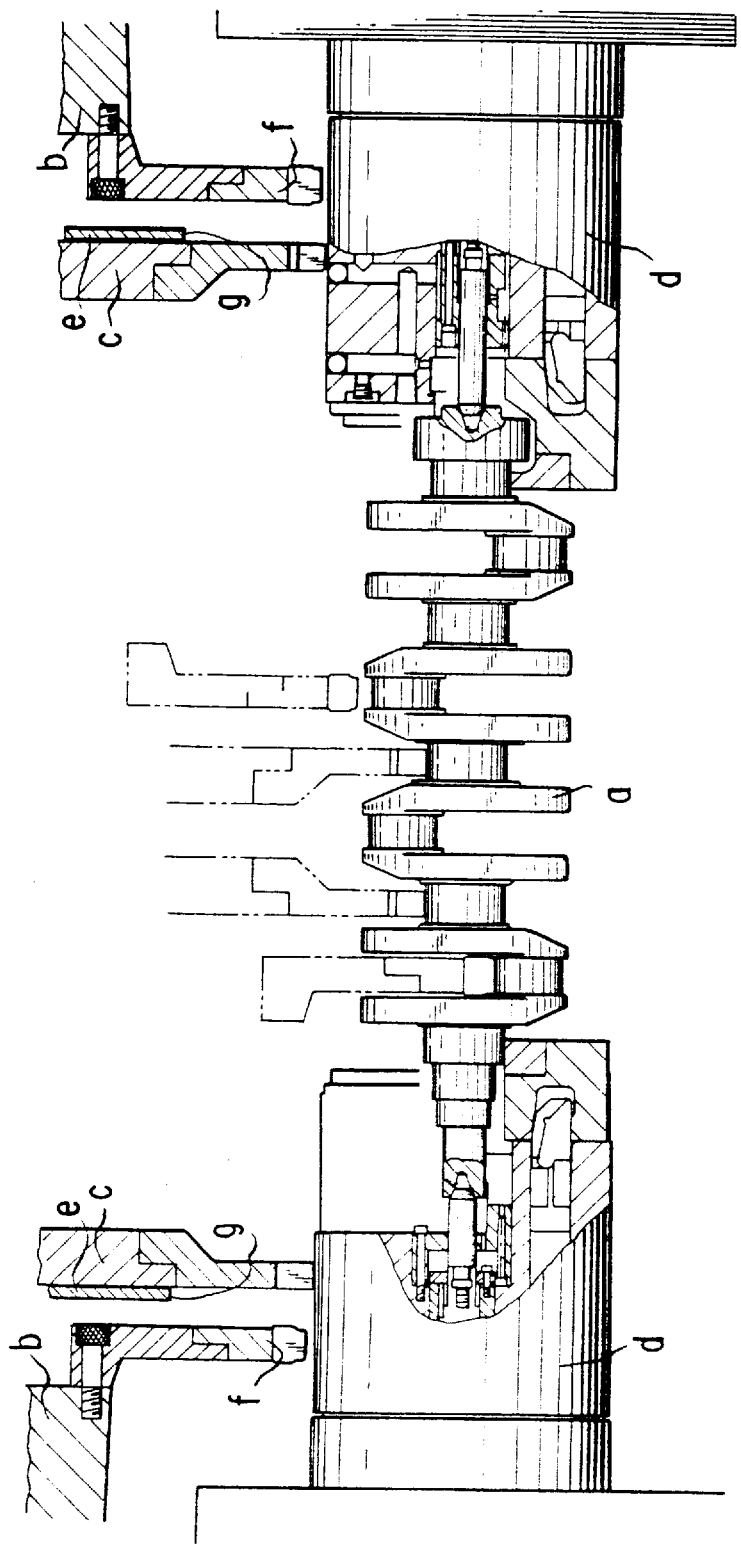
FIG. 1 is an explanatory illustration showing the conventional chip flying around preventing arrangement of a crankshaft miller.
Figure 2:
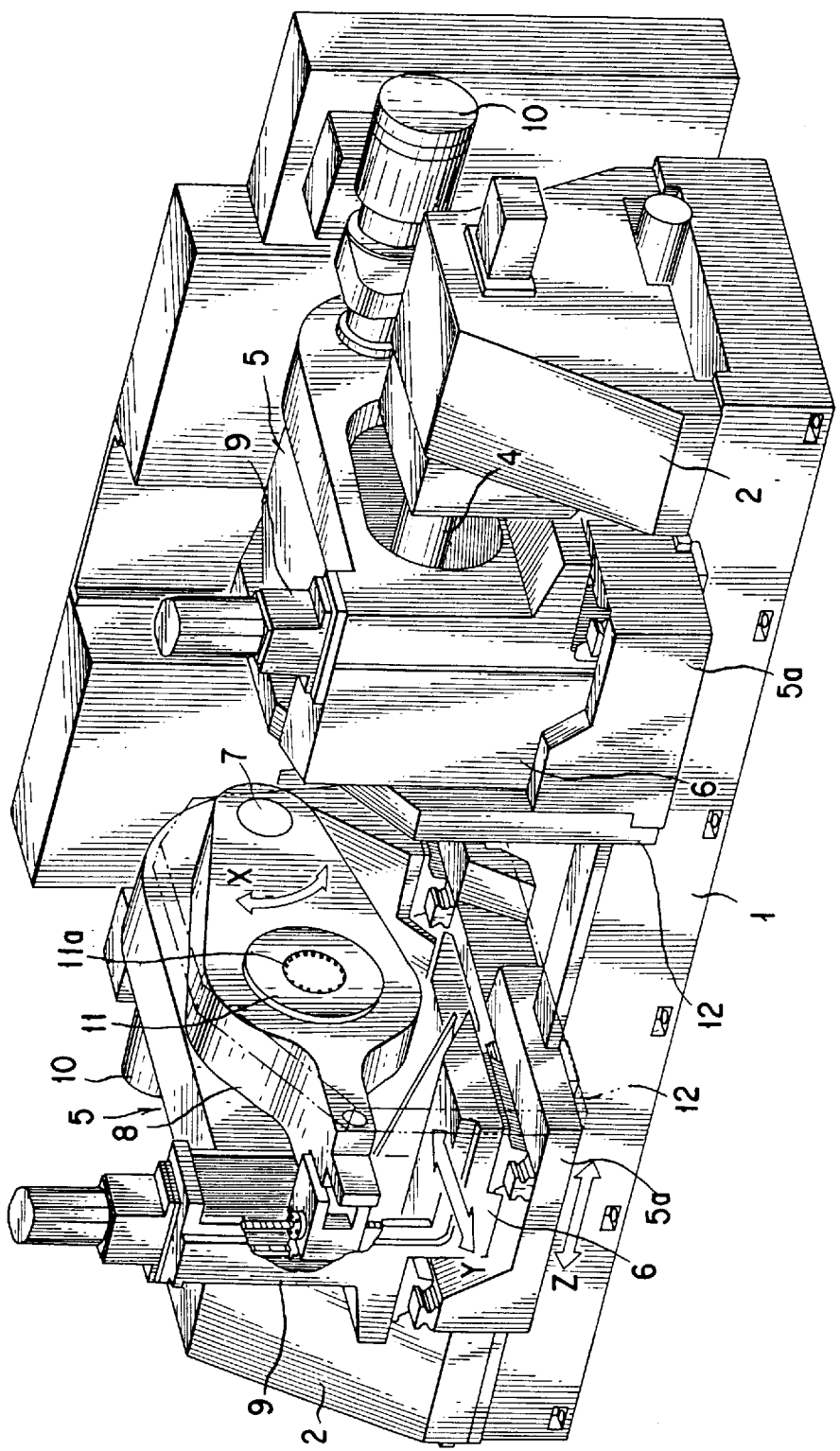
FIG. 2 is a perspective view showing a crankshaft miller provided with a preferred embodiment of a chip flying around preventing arrangement according to the present invention.

FIG. 2 is a perspective view showing a crankshaft miller, to which a chip flying around preventing arrangement according to the present invention is applicable. In FIG. 2, the reference numeral 1 denotes a bed, and 2 denotes work heads arranged at both ends of the bed 1. Chucks 4 are provided on opposing surfaces of both work heads 2 for clamping and thus securing both ends of a work 3 (not shown in FIG. 2).

The reference numeral 5 denotes a pair of machining units provided on the bed 1 between the work heads 2. The machining units 5 are movable a longitudinal direction of the bed 1 by saddles 5a provided at a lower portion of the units. Slides 6 are provided on the saddles for movement in the Y-axis direction perpendicular to the motion direction (Z-axis direction) of the saddle 5a. On respective of the slides 6, swing arms 8 pivoted at one end by pins 7 (only one is shown) are provided.

The other end portion of each of the swing arms 8 is connected with a swing mechanism 9 provided on the corresponding slide 6. The swing mechanism 9 is designed for driving the associated swing arm 8 about the pin 7 in vertical direction (in the direction of X-axis). On each swing arm 8, a plurality of cutter drums 11 which are rotatingly driven by a cutter motor 10, are provided. These cutter drums 11 have cutters 11a mounted via adapters 11b to perform cutting work for the work 3.

Figure 4:
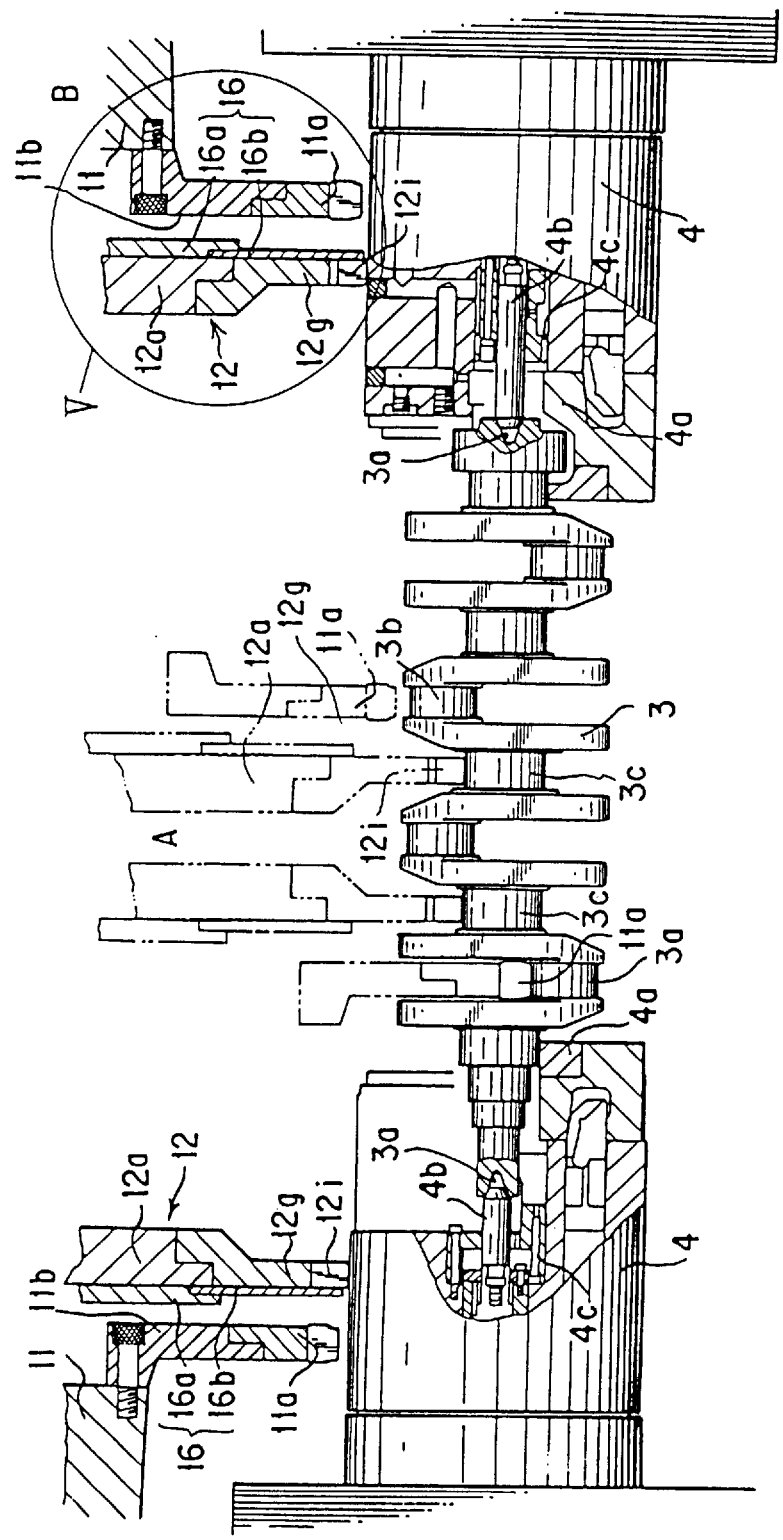
FIG. 4 is a partially sectioned front elevation showing a relationship in position of the preferred embodiment of the chip flying around preventing arrangement and chucks clamping both ends of a work.

On the other hand, the chucks 4 clamping both ends of the work 3 are constructed with a plurality of claw bodies 4a movable in radial direction for clamping both ends of the work 3, as shown in FIG. 4. At the center portion of chuck 4, a center 4b supporting a center hole 3a formed on the end face of the work 3 is provided.

In the vicinity of the center 4b, a plurality of air ejection holes 4c for blowing air to prevent deposition of chips within the chuck 4 are formed.

Figure 3:
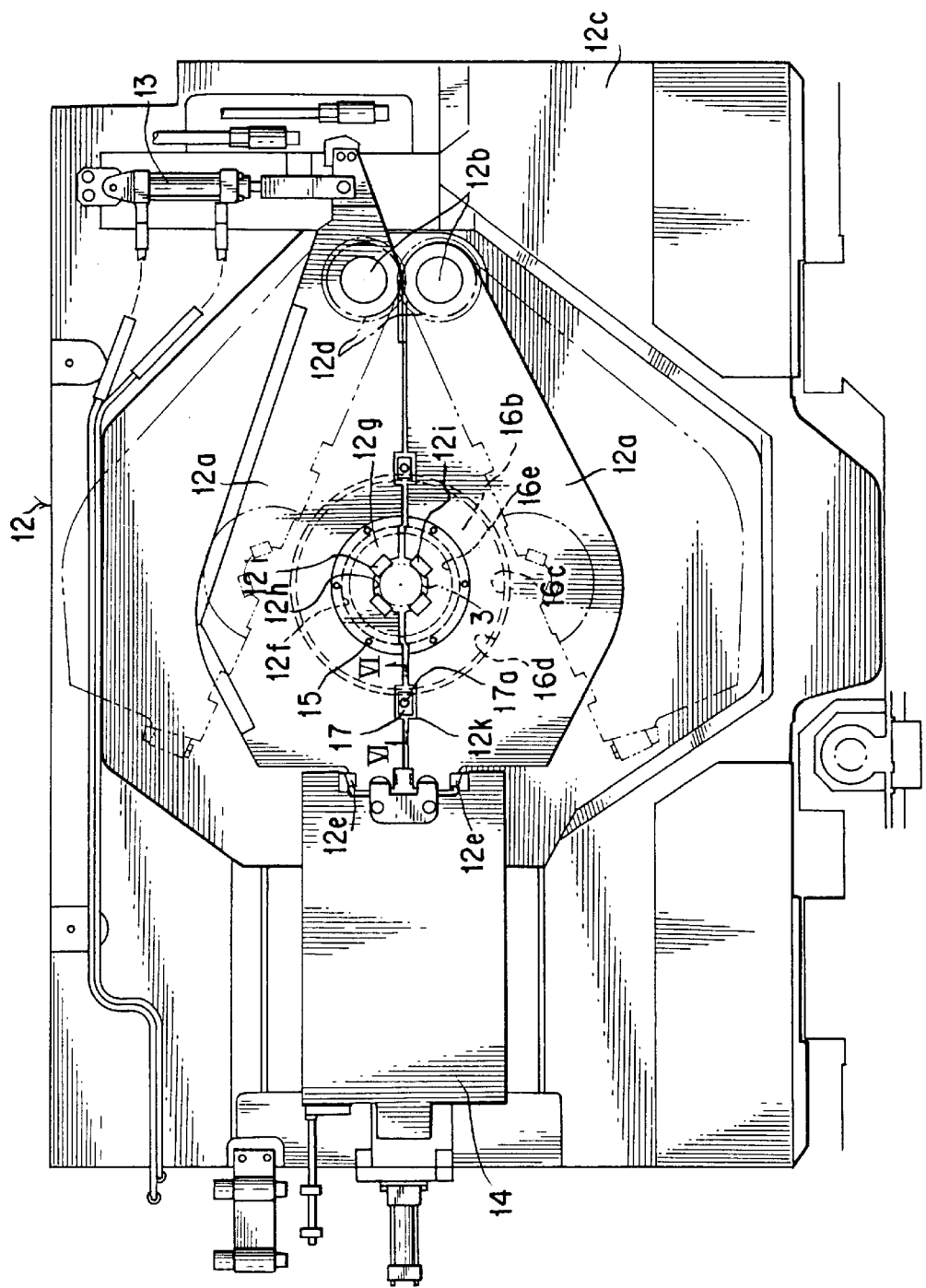
FIG. 3 is a front elevation of a rest device, on which the preferred embodiment of the chip flying around preventing arrangement.

On the other hand, between opposing surfaces of the saddles 5a, a rest device 12 for supporting the work 3 during cutting work, is provided. As shown in FIG. 3, the rest device 12 has a pair of rest arms 12a divided vertically. A pair of rest arms 12a are pivotably mounted on a rest main body 12c by means of pins 12b, at respective ends thereof.

At the pivoted portions of the respective rest arms 12a, mutually engaging gears 12d are provided. Thus, when the upper rest arm 12a is driven to pivot about the pin 12b by means of a clamping cylinder 13, force exerted on the upper rest arm 12a is transmitted to the lower rest arm 12a via the interengaging gear 12d to pivot the lower rest arm about the pin 12b in opposite direction, synchronously. By this, the other ends of the rest arms 12a can be opened and closed in a vertical direction.

On the other ends of both rest arms 12a, a locking mechanism 14 for locking respective rest arms 12a by clamping stepped portions 12e formed at the other ends of the rest arms in a vertical direction, is provided.

These opposing surfaces of respective rest arms 12a, semicircular cut-outs 12f are formed. These cut-outs 12f, respectively semicircular rest members 12g are detachably mounted by means of fixtures 15.

On the center portions of respective rest members 12g, semicircular cut-outs 12h are formed. On the inner periphery of the cut-outs 12h, a pair of pads 12i for supporting outer peripheral surfaces of the work 3 during cutting work of the work 3, are mounted.

Opposing the rest main body 12c, on which the rest arms 12a are mounted, a chip deflecting cover 16 including a main cover 16a and an auxiliary cover 16b, is provided.

Figure 5:
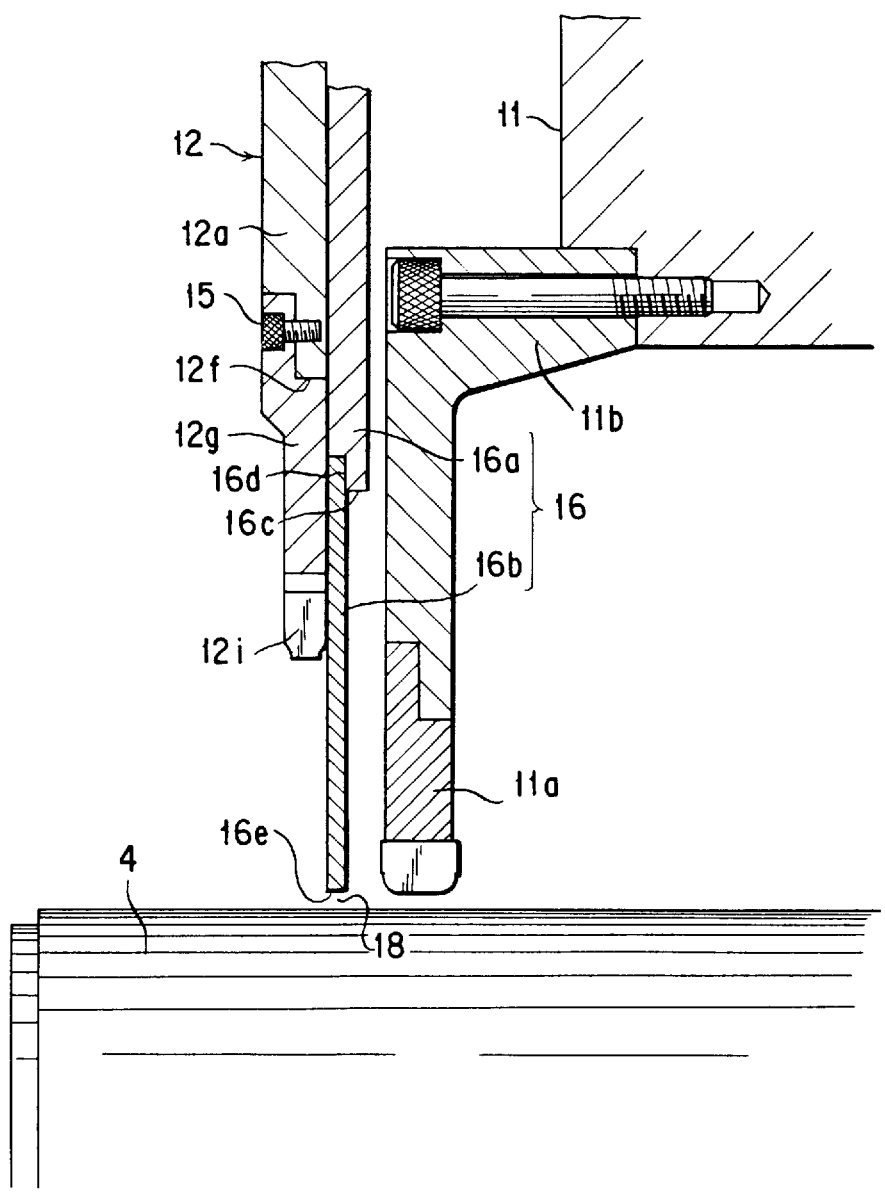
FIG. 5 is an enlarged illustration of an encircled portion indicated as V in FIG. 4.

The main cover 16a is integrated with the rest main body 12c. As shown in FIG. 5, a circular opening 16c having a diameter sufficiently larger than the external diameter of the chucks 4 and larger than the external diameter of the cutter 11a, is formed in the main cover 16a so that it may not interfere with exchanging of the cutter 11a by moving the machining unit 5 at the stand-by position B shown in FIG. 4 and removing the cutter 11a from the adapter 11b at this position.

In order to prevent chips from flying around when the machining unit 5 is moved to the stand-by position B, at which flying around of chips occurs through the opening 16c with sufficiently large diameter by falling down of chip depositing on the inner periphery of the cutter drum 11 by centrifugal force, otherwise, the auxiliary cover 16b is provided for the main cover 16a.

Namely, the outer peripheral edge portion of the auxiliary cover 16b is engaged on a stepped portion 16d formed on the peripheral edge portion of the opening 16c of each main cover 16a from the side of the rest arm 12a, as shown in FIG. 5. The auxiliary cover 16b is fixed on the main cover 16a by means of clampers 17 (see FIG. 3) at two portions, for example.

Figure 6:
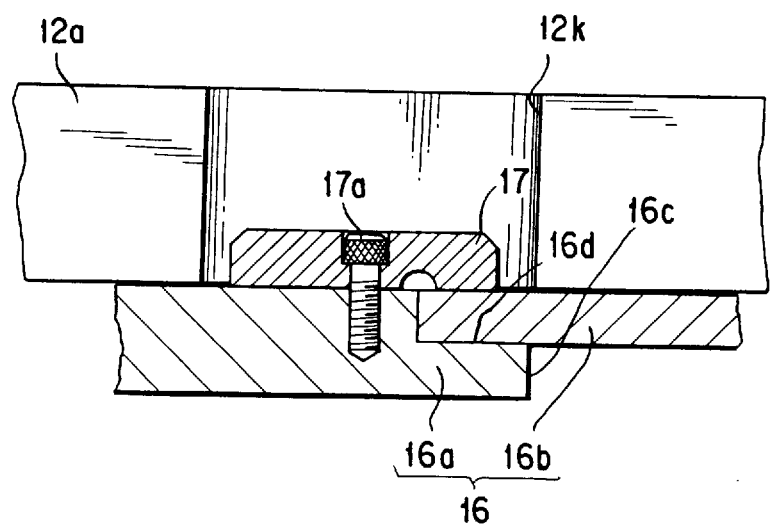
FIG. 6 is a section taken along line VI—VI of FIG. 3.

As shown in FIG. 6, the clamper 17 has a fixture 17a at substantially central position thereof. By tightening the fixture 17a, the auxiliary cover 16b is clamped between the tip end of the clamper 17 and the stepped portion 16d of the main cover 16a. In order to avoid interference with the clampers 17 at the closing position of the rest arms 12a, cut-outs 12k are formed on the mating surfaces of the rest arms 12a.

At the central portion of the auxiliary cover 16b, an opening 16e is formed. The opening 16e is of circular configuration with a diameter slightly greater than the external diameter of the chuck 4 so that the auxiliary cover 16b may not interfere with the outer peripheral surface of the chuck 4 even at the stand-by position B of the machining unit 5.

Next, discussion will be given for the function of the shown embodiment of the chip flying around preventing arrangement provided in the rest device 12. During cutting work of the work 3 whose both ends are gripped by the chucks 4, the left and right machining units 5 are located at machining positions A, as shown in FIG. 4. Then, by means of the cutters 11a mounted on the cutter drum 11, a pin portion 3b of the work is cut. The rest device supports a journal portion 3c adjacent the pin portion 3b being processed.

Then, when all of cutting work for the pin portion 3b is completed, the machining unit 5 is moved to the stand-by position B shown in FIG. 4 while maintaining the rest arms in opening position. In this condition, when rotation of the cutter drum 11 is stopped, the chips being deposited on the inner peripheral surface of the cutter drum 11 by centrifugal force fall down by their own weight due to a reduction in the centrifugal force. However, since only a small clearance 18 is defined between the auxiliary cover 16b of the chip flying around preventing cover 16 and the outer periphery of the chuck 4, falling chips will not escape to the environment.

Thus, the flying around of chips upon stopping of the cutter 11a can be successfully prevented.

On the other hand, when the cutter 11a is exchanged at the stand-by position B, by removing the auxiliary cover 16b from the main cover 16a by loosening the fixture 17a of the clamper 17, the cutter 11a can be exchanged similarly to the prior art.

While the shown embodiment employs a thin plate, such as a iron plate, as the auxiliary cover 16b, it can be a synthetic resin plate as long as sufficient rigidity and sufficient heat resistance is provided.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An arrangement for preventing chips from deflecting for a crankshaft miller which performs cutting work by means of a cutter mounted on a rotary cutter drum, for a work whose both ends are gripped by chucks, a portion of said work in the vicinity of a processed portion of said work is clamped by rest arms which are pivotably mounted in a rest main body to be opened and closed, comprising:

a chip deflecting cover including;

a main cover positioned in the vicinity of said rest arms and having an opening with a diameter sufficiently larger than an external diameter of said chuck when a machining unit is positioned at a stand-by position, and said main cover is rigidly fixed on said rest main body; and an auxiliary cover mounted on an opening portion of said main cover and having an opening with a diameter slightly larger than the external diameter of said chuck.

2. An arrangement as set forth in claim 1, wherein said auxiliary cover is detachably mounted on said main cover.

3. A crankshaft miller comprising:

a rotary cutter drum carrying a plurality of tips;

work supports supporting both ends of a work to be processed;

work resting means including a rest main body and rest arms pivotably mounted on said rest main body for gripping a portion of said work in the vicinity of a portion of said work being machined;

a plurality of chip deflecting covers positioned in vicinity of said rest arms, each of said covers including:

first cover members with a covering plane perpendicular to axis of said work support, said first cover members are rigidly fixed on said rest main body, said first cover members defining a first opening, and a peripheral edge of said first opening being located away from the outer peripheral surface of corresponding said work support for defining an annular clearance therebetween, and second cover members arranged within said annular clearance between the peripheral edge of said first opening and the outer periphery of said work support for surrounding said corresponding work support with a covering plane perpendicular to the axis of said work support, and said second cover member being detachably secured on said first cover member.

4. A crankshaft miller as set forth in claim 3, which further comprises clamping means rigidly secured on each of said first cover members for clamping each of said second cover members while said second cover members are set within said annular clearance.

5. A crankshaft miller as set forth in claim 4, wherein said clamping means are provided at radially symmetrical positions on said first cover members.

6. A crankshaft miller as set forth in claim 5, wherein each of said rest arms is provided with means for accommodating said clamping means at a gripping position thereof.

7. A crankshaft miller as set forth in claim 3, wherein said second cover members define a second opening for permitting said work supports to pass therethrough, the peripheral edge of said second opening is opposite to the outer periphery of said work supports with an annular clearance defined therebetween.

8. Apparatus for preventing the release of chips from a crankshaft miller having a cutter mounted on a rotary cutter drum for performing cutting on a workpiece, said miller including chucks operative to grip opposite ends of said workpiece and rest arms operative to open and close and thereby grip said workpiece in the vicinity thereof being cut, said apparatus comprising a cover structure including:

a main cover positioned adjacent said rotary cutter drum and having an opening in facing relation to one of said chucks whose diameter is greater than an external diameter of said one chuck by an amount sufficient to access said cutters on said rotary cutter drum when said rotary cutter drum is in a stand-by position; and an auxiliary cover detachably secured to said main cover about said opening therein, said auxiliary cover having an arcuate edge defining an opening with a diameter sufficient to position said edge in closely spaced relation with respect to said chuck.

9. Apparatus as set forth in claim 8 including releasable clamping means operative for detachably mounting said auxiliary cover on said main cover.

10. A crankshaft miller for processing a workpiece, comprising:

a rotary cutter drum carrying a plurality of tips;

work supports supporting both ends of said workpiece to be processed;

cover means for preventing the release of chips produced by said miller positioned in the vicinity of said rotary cutter drum, said means including:

first cover members operative to provide said work supports with a covering plane extending perpendicular to an axis of an associated work support, said first cover members each defining a first opening of a size for allowing an adjacent work support to pass therethrough, said first opening having a peripheral edge spaced from an outer peripheral surface of an adjacent work support to define an annular clearance therebetween; and second cover members disposed within said annular clearance defined between the peripheral edge of said first opening and the outer peripheral surface of said work support for surrounding said corresponding work support, said cover members defining a covering plane perpendicular to the axis of said work support, and said second cover members being detachably secured to said first cover member.

11. A crankshaft miller as set forth in claim 10, which further comprises clamping means releasably secured to each of said first cover members for clamping a second cover member to a first cover member while said second cover member is set within said annular clearance.

12. A crankshaft miller as set forth in claim 11, which further comprises work resting means including a rest main body and a rest arm pivotably mounted on said rest main body for gripping a portion of said workpiece in the vicinity of a portion being processed, and each of said first cover members being rigidly fixed to said rest main body.

13. A crankshaft miller as set forth in claim 12, wherein said clamping means are each provided at radially symmetrical positions on the associated first cover member.

14. A crankshaft miller as set forth in claim 13, wherein each of said rest arms is provided with recess means for accommodating said associated clamping means thereon.

15. A crankshaft miller as set forth in claim 10, wherein said second cover members define a second opening for permitting said work supports to pass therethrough, said second opening having a peripheral edge spaced from the outer periphery of said work support to provide minimum clearance therebetween.

16. A crankshaft miller as set forth in claim 10, which further comprises work resting means including a rest main body and rest arms pivotably mounted on said rest main body for gripping a portion of said workpiece in the vicinity of a portion being processed, and each of said first cover members being rigidly fixed to said rest main body.

\* \* \* \* \*